United States Patent Office 2,832,059
Patented Apr. 22, 1958

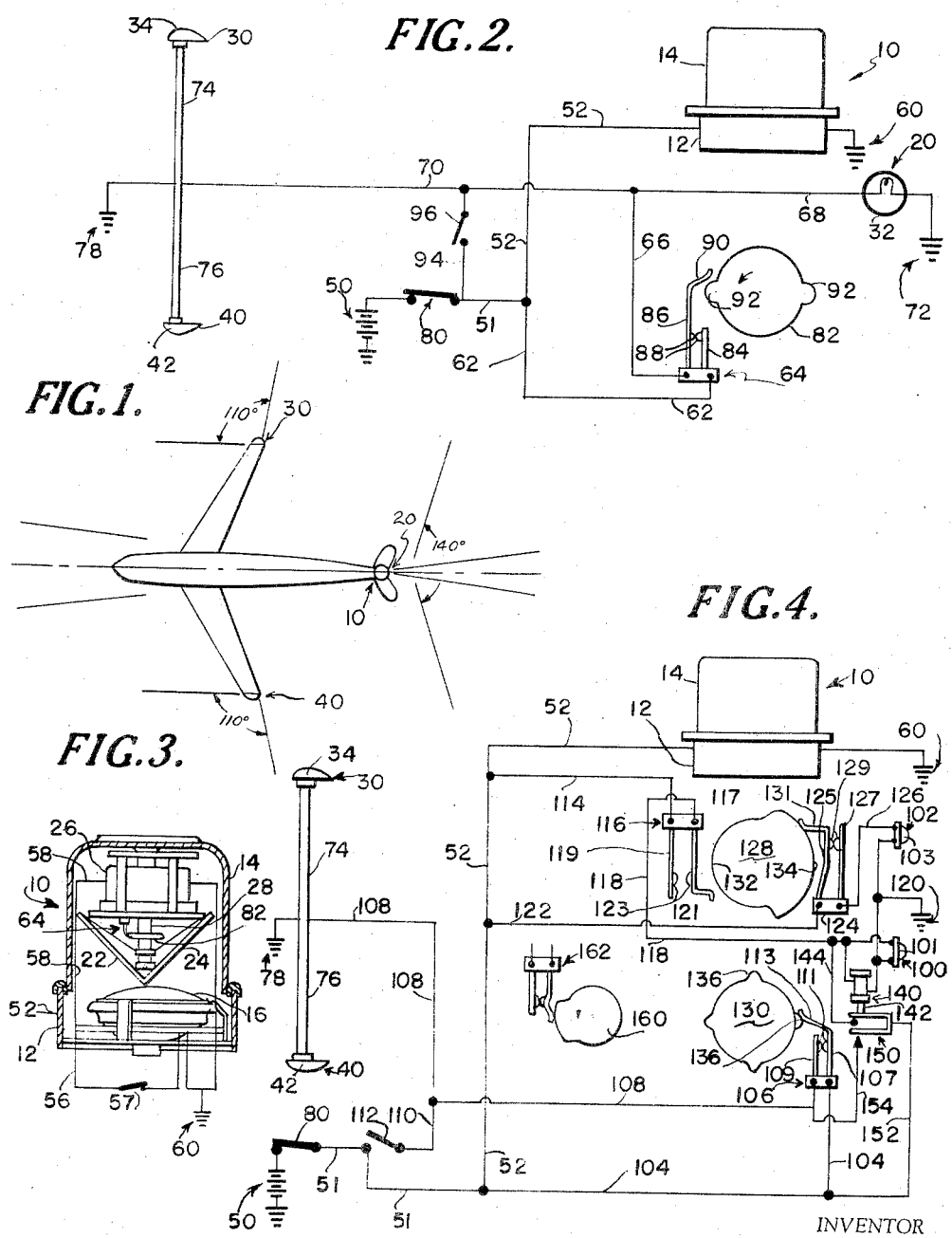

2,832,059
EXTERNAL LIGHTING SYSTEM FOR AIRPLANES

Charles Adler, Jr., Baltimore, Md., assignor to the United States of America as represented by the Administrator of Civil Aeronautics Application May 24, 1956, Serial No. 587,110

12 Claims. (Cl. 340—25)

The present invention relates to new and improved signalling systems for indicating the position and direction of flight of aircraft.

Signalling systems presently employed on commercial and other aircraft for indicating position and direction of flight include a revolving or rotating beacon disposed along the longitudinal axis of the aircraft, a stationary wide-angle green light and red light mounted respectively on each wing tip and a stationary wide-angle white light or white and red light mounted on the tail end of the aircraft. In these systems, a motor is provided for revolving the revolving beacon and a flasher unit is provided separately from the revolving beacon for periodically extinguishing and relighting the tail lights or the tail lights and wing tip lights. It has been found to be extremely difficult, in such systems, to effect proper synchronization of the flashing of the stationary lights with the revolving beacon since the flasher unit is independent of the revolving beacon. Unless the aircraft lights remain in proper synchronization the direction of flight of the aircraft cannot be accurately and readily determined from another aircraft or from the ground since a constantly changing and confusing flashing sequence will be observed. Such a condition could easily result in an inaccurate or delayed judgment of the position and direction of flight of the aircraft, by observers either on the ground or in other aircraft, and thereby give rise to possibly dangerous situations.

It is accordingly a principal object of the present invention to provide an aircraft signalling system involving a revolving beacon and stationary position lights wherein the means for flashing the stationary lights is operatively connected to the revolving beacon to be actuated thereby so that the system may be readily and permanently synchronized.

Another object of my invention is to provide a signalling system, of the type under consideration, wherein the electrical circuitry for the stationary position lights includes contacts actuated by the motor-driven mechanism for the revolving beacon.

A further object is to provide a signalling system, of the type under consideration, wherein a single switch controls the simultaneous flashing of both the wing and tail lights.

A still further object is to provide a signalling system, of the type under consideration, equipped with a fail-safe device, whereby if the stationary position lights remain off for an undesirable length of time, due to defective operation of the flashing mechanism, a new circuit for these lights will automatically be established for energizing these lights.

An additional object is to provide a signalling system that will accomplish the foregoing objects and which will be simple in construction involving simple electrical circuit arrangements and a minimum of mechanical parts.

Other objects and advantages of the invention reside in specific structural details and will be made more apparent from the following description and accompanying drawings, in which:

Figure 1 is a diagrammatic plan view of an airplane having signal lights arranged on the wing tips and tail assembly;

Figure 2 is a diagrammatic view showing an electrical connection for the aircraft signal lights constituting a preferred embodiment of the present invention;

Figure 3 is an enlarged, elevational view of a preferred form of the anti-collision or beacon light assembly shown in Figure 2; and Figure 4 is a diagrammatic view showing a modified electrical connection for the aircraft signal lights constituting another embodiment of this invention.

Referring now to the darwings, and in particular to Figures 1, 2 and 3, a preferred embodiment of this invention comprises an aircraft signalling system including a revolving beacon assembly 10, a stationary tail light 20, and stationary wing tip lights 30, 40.

The revolving beacon assembly 10 preferably includes a stationary housing 12, a light transmitting lens 14 connected to the housing, a stationary lamp 16 also connected to the housing, and a pair of oppositely disposed rotating reflectors 22, 24; the latter being disposed above the stationary lamp, as seen in Figure 3. The housing 12 of the revolving beacon assembly is intended to be mounted on the upper or lower surface of the fuselage of the aircraft or on the rudder and preferably is disposed along the longitudinal axis of the aircraft. Within the light transmitting lens 14 there is arranged an electrical motor 26 geared to a shaft 28 which in turn is drivingly connected to the rotating reflectors 22, 24. The rotating reflectors may have a plane or parabolic reflecting outer surface which cooperates with the lamp 16 to emit narrow, revolving horizontal beams of light which pass through the lens 14 in diametrically opposite directions. The color of the lens 14 preferably is red although some other distinctive color may be used.

The tail light 20 is mounted in a fixed position on the tail of the aircraft and emits a beam of light having an angular spread in the horizontal direction of approximately 140° (Figure 1) and an angular spread of approximately 180° in the vertical direction. The tail light preferably is provided with a colorless lens 32 to emit a beam of white light.

The wing tip lights 30, 40 are mounted on the starboard and port side of the aircraft, respectively, and preferably emit beams of light of different colors. For example, the port or left wing tip light 40 may have a red lens 42 while the starboard or right wing tip light 30 may have a green lens 34. These wing lights are arranged to emit beams of light preferably having a 110° horizontal angular spread, as seen in Figure 1, and approximately a 180° vertical angular spread. The wing tip and tail lights are constructed and arranged so that the combined horizontal angular spread of beams of light emitted therefrom is 360°, thereby making one or more of these beams visible from any angular position around the aircraft whether above or below the same; whereas, the narrow horizontal beams from the revolving beacon assembly 10 do not have a wide vertical spread and are primarily visible only as narrow beams at such times as the beams are substantially or directly in line with the point of observation.

A battery 50 or other source of electrical power is arranged as shown in Figure 2 to supply electrical energy to the various signal lights and to the revolving beacon motor in the following manner. A lead wire 52 is connected between a wire 51 from the battery 50 and the revolving beacon assembly 10. This lead wire 52 branches into a conductor 56 connected to the stationary light 16 in the beacon assembly and also into a conductor 58 connected to the motor 26 therein. A ground 60 is provided for the lamp 16 and motor 26 as shown. Another lead wire 62 extends from the battery 50, in parallel with the lead wire 52, and is connected to a switch 64. A lead 66 is arranged to extend from the switch 64 to branch conductors 68, 70; the conductor 68 leads directly to the tail light 20 and a suitable ground 72 is provided therefor; while the other branch connection 70 establishes a circuit to the wing lights 30, 40 through leads 74, 76 to pass current simultaneously to each of the latter. A ground 78 is provided for the wing tip lights.

A main switch 80 is provided in wire 51 leading to the wires 52 and 62. The switch 80 obviously controls the flow of current to the various loads in the circuit, so that upon closing this switch the signalling system will be put into operation. Switch 64 is only effective to regulate the flow of current to the wing and tail lights. This latter switch is disposed within the beacon assembly 10, subjacent the motor 26 and juxtaposed to a cam 82 which is drivingly connected to the shaft 28. Switch 64 comprises a stationary arm 84 connected to the lead 64, and also comprises a movable arm 86 connected to the wire 66. These arms are made of an electrically conductive material and have contacts 88 thereon, adapted to engage each other when the switch is in a closed position to permit current to pass from the battery 50 to the wing tip and tail lights. Movable arm 86 preferably is longer than the arm 84 and is continuously biased thereagainst as a leaf spring to normally maintain the switch 64 in a closed position. The movable arm 86 terminates in a crook or bent portion 90 disposed adjacent cam 82 and adapted for cooperation therewith for opening switch 64.

Cam 82 preferably is of disc-like configuration, made of a suitable electrically non-conductive material and includes a pair of diametrically opposed projections or lobes 92, with the crook 90 of the movable arm extending within the path of travel of these lobes. The cam 82 is positioned on shaft 28 so that it will undergo a rotation uniform and aligned with the rotation of the beacon reflectors 22, 24 wherein the cam lobes 92 will be disposed, at all times, along the axis of the diametrically opposed beams emitted from the beacon assembly 10. Additionally, the movable arm 86 of the switch 64 preferably is positioned adjacent the cam 82, along the longitudinal axis of the aircraft, so that a cam lobe 92 will engage the crook 90 in the movable arm only when the lobes are aligned with the longitudinal axis of the aircraft. When either of the cam lobes engages the crook 90 in the movable switch arm 86, it will move this arm away from the stationary arm 84 a sufficient distance to separate the contacts 88 thereby opening the switch 64. With switch 64 opened, the circuit to the wing and tail lights will be broken and these lights extinguished; however, immediately upon disengagement of the cam lobe 92 and movable arm 86 this circuit will be closed and these lights energized due to the spring bias of the movable arm 86. It should thus be apparent that for every revolution of the revolving beams of light emitted from the beacon assembly 10, the branch circuit to the wing and tail lights will be opened and closed twice to give a flashing effect to the latter lights when the axes of the revolving beacons are in alignment with the longitudinal axis of the aircraft. At all other times the stationary wing and tail lights will be lighted.

The size of cam lobes 92 and the speed of the motor 26 preferably are designed to keep the switch 64 in an opened position for a very short period of time, for example, 0.4 second or just long enough for the eye not to retain the vision of the wing and tail lights, and this occurs when the revolving beacon assembly beams are on the longitudinal axis of the aircraft while the switch will be closed for a considerably longer period of time to keep the wing and tail lights burning long enough to compensate for the relatively long period of darkness between revolutions of the beacon beams. Inasmuch as the switch 64 controls the flow of current to both the wing and tail lights, these lights will be burning most of the time and will be extinguished simultaneously only when the revolving beacon lights are on the longitudinal axis of the aircraft, to impart a very distinctive and attention arresting flashing sequence to the signalling system, especially when viewed from the front or rear of the aircraft. This flashing sequence will be the same at all times to give observers a clear and unmistakable indication of the position and direction of flight of the aircraft, irrespective of the point of observation. Naturally, the relative periods of time during which the stationary wing and tail lights are on and off can be varied by changing the size and number of cam lobes 92 and thereby change the flashing sequence. In this connection, it may be preferred to dispose the movable arm 86, of switch 64, 90° or a quarter of a turn around cam 82 from its position described hereinabove whereby the wing and tail lights will be extinguished or flashed only when the revolving beacon beams are at right angles to the longitudinal axis of the aircraft. In some instances, this might be required due to local or national regulations regarding aircraft signal lights.

A wire 94 may be connected to battery 50 and conductor 70 for the wing and tail lights to by-pass the switch 64. A normally open switch 96 will be provided in the lead 94 whereby a continuously closed circuit for wing tip lights 30, 40 and tail lights 20 may be established by closing this switch, if the switch 64 fails, to have these lights burn steadily. Also, a normally closed switch 57 may be arranged in the wire 56 for the beacon lamp 16 whereby the pilot will be able to extinguish the beacon lamp by opening this switch without interfering with the operation of the motor 26 and flashing wing tip and tail lights. This will permit the pilot to extinguish the revolving beacon lights when the aircraft is flying through cloud formations, which normally reflect the revolving beacon lights into the cockpit of the aircraft in an annoying and irritating manner.

An aircraft signalling system constituting a second embodiment of the present invention is illustrated in Figure 4 wherein parts similar to those described hereinabove are given like reference numerals. This signalling system preferably comprises the revolving beacon assembly 10, stationary tail lights 100, 102 and the stationary wing tip lights 30, 40. The revolving beacon assembly 10 of Figure 4 may be identical to the assembly of Figure 3 to emit the usual pair of diametrically opposed and narrow horizontal revolving red beams of light, and is also arranged on the longitudinal axis of the aircraft. Wing lights 30, 40 in Figure 4 may be identical to the wing lights described for Figure 2, while the tail lights 100, 102 preferably emit beams of different colors. For example, the tail light 100 may be provided with a white lens 101 to emit a white beam and the tail light 102 may be provided with a red lens 103 to emit a red beam. Each of the tail lights 100, 102 is designed to emit a beam of light of the same horizontal and vertical spread as tail light 20 of Figure 2.

The battery 50 or other suitable source of electrical power, in the embodiment shown in Figure 4, is connected to the wing and tail lights and the revolving beacon housing in the following manner. The lead wire 52 is again connected between a wire 51 from the battery 50 and the revolving beacon assembly 10 and is connected to the motor and light means within the revolving beacon housing in exactly the same manner as illustrated in Figures 2 and 3 to establish a continuously closed, parallel circuit to these loads. The switch 80 is provided in line 51 to initiate the operation of the signalling system. A circuit for connecting the battery 50 to the wing lights includes a lead wire 104, a normally closed switch 106, and a conductor 108 connected to the wires 74, 76 and the ground 78. A wire 110 extends between conductor 108 and a normally open switch 112 associated with a contact on the wire 51. The switch 106 has a movable arm 107 connected to wire 104 and a stationary arm 109 connected to wire 108. Both arms are made of an electrically conductive material, having contacts 111 thereon, with the movable arm 107 being the longer of the two and terminating at its free end in a crook or bent portion 113. Movable arm 107 acts like a leaf spring and is continuously biased against stationary arm 109 to maintain the contacts 111 closed.

The circuit for the tail light 100 includes lead wire 114 branching off lead 52, a normally open switch 116, lead wire 118 and a ground 120. The circuit for the tail light 102 includes a lead wire 122, a normally open switch 124, lead wire 126 and the ground 120. The switches 116, 124 are substantially identical and also are similar to switch 106. Switch 116 includes a movable and a stationary arm 117, 119 respectively, which are connected to wires 118 and 114. Arm 117 terminates in a crook 121 at its free end, with opposed, normally separated contacts 123 on these arms. Switch 124 includes a movable arm 125 and a stationary arm 127 connected, respectively, to wires 122 and 126 and having contacts 129 thereon. Arm 125 is provided with a crook portion 131 at the free end thereof.

A cam 128 for the tail light circuits, and a cam 130 for the wing lights circuit both preferably made of an electrically non-conductive material, are drivingly connected, in spaced relation, to the shaft 28 in the beacon assembly 10 to rotate uniformly with the revolving beacon beams. The tail light cam 128 may be of disc-like configuration, being formed with a semi-circular portion 132 and a circular arcuate lobe 134, the latter having a greater radius of curvature than the former. The tail light switches 116, 124 are arranged adjacent to and on opposite sides of cam 128 within the beacon assembly 10 with arms 117 and 125 extending in opposite directions as shown. Rotation of cam 128 is effective to periodically close the red tail light switch 124 when the lobe 134 is rotated into engagement with the crook portion 131 on the arm 125. This switch will remain closed throughout the period of time necessary for the lobe 134 to be disengaged from the movable arm 125 at which time this arm will return to its normal, undeformed open-contact position to thereby extinguish the red tail light. The tail light switches and the tail light cam are so designed and arranged that the cam lobe 134 will be out of engagement with both tail light switches twice during each revolution of the cam, i. e., when the lobe 134 is intermediate both arms 117 and 125 and out of engagement therewith, and the lobe 134 will alternately close the red tail light switch and then the white tail light switch during each revolution so as to have either the red tail light or the white tail light on whenever the revolving beacon beams are aligned with the longitudinal axis of the aircraft. Additionally, the arcuate cam lobe 134 preferably subtends an angle greater than 90° so that it will serve to maintain either of the tail light switches in a closed position for a relatively long period of time, i. e., more than one quarter of a revolution of the revolving beacon beams.

The wing light cam 130 is of disc-like configuration, preferably being formed with four lobes 136, equally spaced along the circumference of this cam. Switch 106 is arranged within the beacon assembly 10 with the crook 113 of the movable arm extending into the path of travel of the lobes 136, as shown, to be moved thereby away from the stationary arm and thereby separate contacts 111 to open the switch 106. The cam 130 and switch 106 are arranged to dispose a pair of cam lobes 136 in alignment with the axes of the diametrically opposed revolving beacon beams whereby these lobes will open the switch 106 to extinguish the wing lights whenever the axes of the revolving beams are aligned with the longitudinal axis of the aircraft. It should be obvious that the other pair of lobes on the cam 106 will be brought into engagement with the movable switch arm 107 after the cam lobes aligned with the revolving beams move 90° or one quarter turn from the position wherein they were aligned with the longitudinal axis of the aircraft. In this manner, the wing lights will be extinguished or flashed off every time the revolving beacons are disposed along the longitudinal axis of the aircraft or in a position displaced 90° therefrom. The cam lobes 136 are relatively small and are intended to maintain the switch 106 open for a relatively short period of time when engaged with arm 113 while the period of time during which the wing lights are on will be considerably greater.

If it is desired that the wing lights burn steadily and continuously, and not be flashed, the normally open switch 112 should be closed and a continuously closed circuit will thereby be established between the battery 50 and the wing tip lights 30, 40 through the lead wires 51, 110, and 108. This circuit will short circuit and bypass the switch 106.

The signalling system illustrated in Figure 4 provides a unique and distinctive flashing sequence for the wing tip and tail lights which enables observers to determine quickly and correctly the position and direction of flight of the aircraft. In this system one of the tail lights will be burning and both wing lights extinguished when the revolving beacon beams are either aligned with the aircraft longitudinal axis or disposed at an angle of 90° thereto. When the cam lobe is intermediate and out of engagement with the tail light switches 116, 124, the tail lights will both be extinguished and the wing lights will be burning; at these times the revolving beacon beams will be disposed at an acute angle to the aircraft longitudinal axis and this will occur twice during each revolution of the beacon beams.

To protect against a possible failure of the switches 106, 116, and 124 and a consequent extinguishing of the wing tip and tail lights, a fail-safe device may be embodied in the electrical circuit of Figure 4. This fail-safe device preferably includes a slow release relay 140 and a pivoted double pole switch 150. The relay 140 is connected to the lead 118 for tail light 100 and to the ground 120, as shown, and is provided with an armature 142 for operating the switch 150. A conductor 152 connects switch 150 to lead 104 and the switch has two arms adapted to cooperate with a contact on a wire 144 connected to lead 118 and also with a contact on a wire 154 connected to the lead 108. In the operation of this fail-safe device, relay 140 will be energized when tail light switch 116 is closed, by the engagement of cam lobe 134 with crook 121, and accordingly the armature 142 will be elevated to hold the arms of the switch 150 away from the contacts on wires 144 and 154. When the cam lobe is disengaged from the crook 121, switch 116 will open and remain open until the lobe 134 reengages the crook 121. The relay 140 is so constructed that it will maintain armature 142 in an elevated position after switch 116 is opened, for a period of time greater than the period during which this switch is open whereby upon the subsequent closing of switch 116 the relay 140 will again be energized to prevent the switch 150 from closing so long as the system is operating properly. However, should switch 116 become defective and not close the circuit to tail light 100, the relay armature 142 will drop and switch 150 will be released to engage the contacts on wires 144, 154. At this time, current will flow through leads 104 and 152 to be branched through wire 144 to the tail light 100 and by the wire 154 to the lead 108 and wing lights 30, 40 by-passing switch 106. Once these circuits are closed, current will also be directed to the relay 140 which will then operate to periodically open and close switch 150 to flash these lights. It will be understood, that additional relays and switches similar to relay 140 and switch 150 may be arranged in the circuit for tail light 102 or the circuit for the wing lights to close these circuits if the switches 124 and 106 fail to operate. Additionally, a fail-safe device, such as that described above, may be provided to automatically operate the switch 96 in the embodiment of Figure 2 in the event of failure of the switch 64.

If desired, additional lights mounted on the fuselage or front of the aircraft may be connected in series with the wing lights 30, 40 to flash simultaneously therewith.

Another cam 160 and switch 162 may be arranged in the beacon assembly 10 to be operated by motor 26 for flashing still other lights mounted on the aircraft. This may be done in either of the embodiments of Figures 2 and 4. All of the switches disclosed herein which are not operated by cams are intended to be operated by the pilot from within the cockpit.

While rotating reflectors 22, 24 and stationary lamp 16 have been described to produce the revolving beacon beams it will be understood that revolving beacon lamps driven by motor 26 may be substituted for this arrangement.

The present invention will thus be seen to completely and effectively accomplish the objects enumerated hereinabove. It will be realized, however, that various changes and substitutions may be made to the illustrated embodiments, described herein for the purpose of illustrating the principles of this invention, without departing from these principles. Therefore, this invention includes all modifications encompassed within the spirit and scope of the following claims.

I claim:

1. A signalling system for indicating the position and direction of flight of aircraft, said system comprising: a revolving beacon assembly for emitting oppositely directed, narrow beams disposed on the longitudinal axis of an aircraft and revolving means therefor; at least one stationary light mounted on the tail of the aircraft for emitting a rearwardly directed beam; a stationary light mounted on each wing tip of the aircraft for emitting laterally directed beams; and means drivingly connected to said revolving means and operatively connected with said tail light for periodically extinguishing and relighting said tail light.

2. The system described in claim 1 wherein said last named means comprises a cam means and a switch for the tail light, said switch being disposed adjacent said cam means to be operated thereby.

3. The system described in claim 2 wherein the cam means is generally circular and includes diametrically opposed lobes, and wherein the switch for the tail light includes a movable arm urged to a switch-closing position, said arm having a portion lying in the path of travel of said cam lobes to be moved thereby to a switch opening position.

4. A signalling system for indicating the position and direction of flight of aircraft, said system comprising: a revolving beacon assembly disposed on the longitudinal axis of an aircraft and emitting a pair of diametrically opposed, narrow beams of lights; means for revolving said beams at least one stationary light mounted on the tail of the aircraft for emitting a rearwardly directed beam; a stationary light mounted on each wing tip of the aircraft for emitting laterally directed beams; and means drivingly connected to said revolving means and operatively connected with said tail light and said wing tip lights for periodically extinguishing and relighting said wing lights and said tail light.

5. The signalling system described in claim 4 wherein the wing lights and the tail lights are electrically connected in parallel and receive power from a common source, and wherein said means drivingly connected to said revolving means comprises a normally closed switch and a cam means revolving with the revolving beams and adapted to periodically open said switch.

6. The system described in claim 5 wherein said revolving means includes an electrical motor arranged in parallel with the wing and tail lights.

7. A signalling system for indicating the position and direction of flight of aircraft, said system comprising: a revolving beacon assembly disposed on the longitudinal axis of an aircraft and emitting two revolving, oppositely directed and narrow horizontal beams of light spaced approximately 180° apart; means for revolving said beams; at least one stationary light mounted on the tail of the aircraft for emitting a rearwardly directed beam; a stationary light mounted on each wing tip of the aircraft for emitting laterally directed beams; and means drivingly connected to said revolving means and operatively connected to said wing lights and said tail lights for simultaneously extinguishing and relighting said wing lights and said tail light when said horizontal beams are aligned with the longitudinal axis of the aircraft.

8. A signalling system for indicating the position and direction of flight of aircraft, said system comprising: a revolving beacon assembly mounted on the upper surface of the aircraft and along the longitudinal axis thereof, said assembly emitting a pair of opposed revolving narrow beams of light; a stationary light mounted on the tail of the aircraft for emitting a rearwardly directed beam; a stationary light mounted on each wing tip of the aircraft for emitting laterally directed beams; a motor for revolving said opposed beams of light; said wing and tail lights and said motor being electrically connected in parallel with a common source of electrical energy; a normally closed switch for controlling the flow of current to said wing and tail lights and means operatively connected to said motor for periodically opening said switch.

9. The system described in claim 8 wherein the means operatively connected to the motor comprises a rotating cam having two diametrically opposed lobes thereon, said lobes and said beams rotating with the same angular velocity and in angular alignment with each other, the normally closed switch including a movable arm constructed and arranged to project into the path of travel of said lobes whereby said cam will open the switch when the axes of the opposed revolving beams are aligned with the longitudinal axis of the aircraft.

10. A signalling system for indicating the position and direction of flight of aircraft, said system comprising: a red revolving beacon assembly disposed on the longitudinal axis of an aircraft, said assembly emitting two revolving and narrow horizontal beams of light spaced 180° apart; a white stationary light mounted on the tail of the aircraft; a red light mounted on one wing tip of the aircraft and a green light mounted on another wing tip of the aircraft; said wing lights being electrically connected in parallel with said tail light; a common source of power for said lights; a normally closed switch in the parallel branch for said wing lights; a normally opened switch in the parallel branch for the tail light; and cam means revolving with said revolving beams for periodically opening and closing said switches.

11. The system defined in claim 10 wherein said tail light and the wing lights are constructed and arranged to produce beams of lights having a combined horizontal angular spread of 360° around the aircraft and a vertical spread of approximately 90° above and 90° below the axes of said latter beams.

12. The system defined in claim 10 wherein the parallel branch for the wing lights is electrically connected to the parallel branch for the tail light, a switch in the connection between said latter lights and being normally urged to a closed position, and relay means responsive to a flow of current to said tail light to retain the latter switch in an opened position and to release said latter switch to be moved to a closed position after a predetermined period of time to establish a flow of current to said wing lights and said tail light irrespective of the position of said wing and tail light switches.

References Cited in the file of this patent

UNITED STATES PATENTS

| | | |
|---|---|---|
| 1,718,850 | Bowen | June 25, 1929 |
| 2,365,038 | Adler | Dec. 12, 1944 |
| 2,577,296 | Alles | Dec. 4, 1951 |
| 2,719,281 | Roth | Sept. 27, 1955 |
| 2,719,282 | Roth | Sept. 27, 1955 |
| 2,814,029 | McRea | Nov. 19, 1957 |